United States Patent [19]
Held

[11] Patent Number: 5,496,648
[45] Date of Patent: Mar. 5, 1996

[54] FORMABLE COMPOSITE LAMINATES WITH CELLULOSE-CONTAINING POLYMER RESIN SHEETS

[76] Inventor: Russell K. Held, 7591 N. U.S. 131, Manton, Mich. 49663

[21] Appl. No.: 334,118

[22] Filed: Nov. 4, 1994

[51] Int. Cl.⁶ .......................... B32B 23/08; B32B 15/08; B32B 27/10
[52] U.S. Cl. .......................... 428/511; 428/248; 428/298; 428/285; 428/286; 428/461; 428/479.6; 428/512; 428/528; 428/530
[58] Field of Search .................................. 428/511, 512, 428/528, 530, 461, 479.6, 537.5, 286, 285, 298, 248

[56] References Cited

U.S. PATENT DOCUMENTS

| | | |
|---|---|---|
| 3,475,261 | 10/1969 | Ettore . |
| 3,658,622 | 4/1972 | Horowitz . |
| 3,730,828 | 5/1973 | Meiser . |
| 4,865,912 | 9/1989 | Mitsumata ............................. 428/511 |
| 5,073,431 | 12/1991 | Martinuzzo . |

Primary Examiner—P. C. Sluby
Attorney, Agent, or Firm—Richard C. Litman

[57] ABSTRACT

The present invention relates to multilayer wood veneer composite laminates, the outermost layer of which is a natural wood veneer, and the substrate of which is a plurality of layers of cellulose-containing plastic sheets, and a method to make the composite laminate. The composite laminate according to the present has the look, feel, heft, and sound when struck of natural wood. The method has a very short cycle time, which increases the utilization of capital equipment, and includes the steps of laying-up the substrate layers, pre-heating the substrate layers, applying adhesive to the bottom surface of the outer layer or layers, laying-up the outer layer(s) on the pre-heated substrate layers, and cold pressing the layers in a compression die. The laminate is then de-molded. If a metal die is utilized, the laminate will be cool upon de-molding.

3 Claims, 3 Drawing Sheets

FORMABLE COMPOSITE LAMINATES WITH CELLULOSE-CONTAINING POLYMER RESIN SHEETS

BACKGROUND OF THE INVENTION

1. Field of the Invention

The present invention relates to composite laminates of a sheet material, such as wood veneer, and a substrate comprised of multiple layers of polymer resin sheets, and a method of making such composite laminates. More specifically, the present invention relates to multilayer wood veneer composite laminates, the outermost layer of which is a natural wood veneer, and the substrate of which is a plurality of layers of cellulose-containing plastic sheets. The composite laminate according to the present has the look, feel, heft, and sound when struck of natural wood. The method has a very short cycle time, which increases the utilization of capital equipment.

2. Description of the Prior Art

Wood veneers and other composite laminates made from natural materials have been in use for quite some time. For instance, such functional, as well as aesthetically pleasing, articles such as fine furniture, wood veneer wall coverings and parquet floors are made from laminates of wood veneer. However, because wood is a product of nature it is subject to a wide range of natural variations in color, grain size, grain direction, humidity content, and the like. For instance, single layer wood veneers will warp or twist due to the anisotropy of the natural grain of the wood.

In instances where a thicker, more substantive wood veneer is needed, multiple layers of wood veneers can be glued together to form a wood laminate. However, if the grain of each of the veneer layers is oriented in the same direction, the multilayer veneer laminate will warp in the same fashion as a single layer veneer. Also, excessive warpage will also cause the wood layers to delaminate. Therefore, in multilayer laminates of wood veneers, the veneer layers are staged in alternating "with-grain" and "cross-grain" directions in order to minimize warpage of the finished laminate. However, to properly orient the "cross-grain" layers so as to effectively limit warpage necessitates a costly and labor-intensive "stitching" step. Without the "stitching" step, the finished laminate will exhibit unacceptably high warping or twisting.

Another method to increase the thickness of a wood veneer is to laminate a thin veneer to a more substantial substrate of a different material, such as a plastic sheet. However, one of the problems associated with applying a single layer of veneer over a plastic substrate is accounting for the differences in thermal expansion of the diverse materials. The large difference in the coefficient of expansion between natural woods and plastic resins causes delamination of the layers. Delamination is particularly troublesome when the laminate is subjected to large variations in temperature and/or humidity. This makes such laminates commercially unacceptable.

One way others have addressed this issue is by way of a multi-step process that first forms and bond a wood veneer to a thin aluminum sheet in a compression die and then, in a second step, placing the laminate into a plastic injection mold where, for instance, a glass-filled ABS thermoplastic is injected behind the aluminum sheet, where it acts as a substrate. This process is both cumbersome and uneconomical because it requires extra process steps and tooling costs.

Another problem associated with wood veneer/plastic substrate composites is that they are often perceived as low quality materials due to the sound such composites emit when they are impacted. They sound like plastic sheets, rather than a solid wooden board. In high value applications, such as automotive interiors or furniture applications, this sound is commercially unacceptable. In order to be commercially acceptable, a wood veneer/plastic resin composite laminate must be distinguishable from lower perceived-value plastic parts. The present invention solves this problem by incorporating cellulose into the plastic resin substrate of the presently claimed composite laminate. This gives the present laminate the heft and sound when struck of an all-wood laminate, while the outer wood veneer layer provides the requisite wooden surface finish.

To eliminate the "stitching" step, and to ensure a commercially acceptable and economical wood veneer composite, many investigators have attempted to laminate a natural wood veneer with a protective plastic coating so as to exclude moisture from the veneer (and thereby limit warpage). For instance, U.S. Pat. No. 3,475,261, issued Oct. 28, 1969, to H. V. Ettore et al., describes a method and apparatus for coating plywood laminates with a protective plastic film. The plastic film, preferably a polyvinyl fluoride film, is adhered to the plywood substrate using an adhesive containing epoxy, acrylic, an accelerator, and a catalyst.

Another method commonly used in plywood laminates is to bond a more expensive hard wood outer layer to a less expensive soft wood core. In the common practice, the layers are first cold-pressed together with an adhesive interposed between the layers. The adhesive provides sufficient bond strength at cold temperatures to provide an initial bond between the plywood layers. The cold-pressed laminate is then heat treated to fully cure the adhesive to yield a finished product. U.S. Pat. No. 3,658,622, issued Apr. 25, 1972, to F. Horowitz et al, describes such a method. The method of Horowitz et al utilizes a urea-formaldehyde adhesive which has been modified by the addition of a phenol-formaldehyde resin, and acidified.

U.S. Pat. No. 3,730,828, issued May 1, 1973, to K. D. Meiser, describes a flexible, post-formable paper and plastic resin laminate in which the barrier layer is a sheet of wood fiber which has been impregnated with a fully cured, unplasticized melamine-formaldehyde resin. The laminate has a thickness of from 50 to 60 mils. The laminate is fabricated by assembling a bottom layer of kraft paper, a layer of crepe kraft paper impregnated with a conventional phenol-formaldehyde resin, a plurality of sheets of regular kraft paper impregnated with the same phenol-formaldehyde resin, and a top barrier sheet of kraft paper impregnated with the fully cured resin described above. The layers are then placed in a laminating press and compressed under a pressure of 1,000 pounds per square inch.

Another laminate utilizing an outer wood veneer tissue is described in U.S. Pat. No. 5,073,431, issued Dec. 17, 1991, to A. Martinuzzo. The laminate described in this reference is made of a delicate natural outer layer glued to a thermoformable resin substrate. The laminate can be glued to a cloth backing and incorporated into sewn goods such as handbags. The laminate includes an outer layer of a high quality wood or vegetable tissue veneer, such as cork, a middle layer of a hot melt adhesive, and a lower layer of a thermoforming plastic material such as PVC. Because both the PVC substrate and the veneer tissues are very thin (0.05 to 0.3, and 0.5 to 1.2 mm, respectively), thermoforming of the laminate is done at relatively low temperatures (40° to 85° C.).

However, as the above references show, in order to securely bond rigid wood laminates of more substantial cross-sections requires high pressures and high temperatures in order to ensure that the glue between the laminate layers cures properly. This is very costly in terms of energy usage, and necessitates a longer cycle time (on the order of 6–12 minutes, depending upon the configuration and thickness of the laminate) to allow the heat to fully penetrate the laminate cross-section. This long cycle time results in lower productivity, and under-utilization of capital equipment. Since cycle times are relatively long, additional machinery must be purchased in order to achieve a larger production volume. This, of course, significantly increases capital outlays.

Another problem inherent in the longer cycle times of the conventional processes is the pre-curing of the batch glue. Longer cycle times means that each batch of adhesive remains in the pot for a longer period of time. If the adhesive has a short or unpredictable pot-life, it will often pre-cure prior to finishing the complete run. This is not only very wasteful of adhesive, but lengthens production time due to the additional time needed to formulate a new batch of adhesive to finish the run.

Of course, the best way to solve these problems is to decrease cycle time. A significantly lower cycle time would both fully utilize capital equipment and increases productivity because more cycles can be run on the laminate press or compression mold. Additionally, shorter cycle times would lessen the odds of the adhesive pre-curing since an entire batch of adhesive could be utilized well before the end of its pot-life. The present invention includes a method for preparing a veneer composite laminate in which the mold dwell time can be as short as one minute.

SUMMARY OF THE INVENTION

The present invention is a laminated sheet or article having a wood veneer, fabric, cloth, cork, foil, vinyl film, formable thin metal sheet, or card stock face layer or layers, and a substrate comprised of a at least one layer of a vegetable or wood fiber-impregnated (preferably cellulose-impregnated) thermoformable plastic resin, and a process to make the laminate. The finished laminate is cold pressed, and can be manipulated in the same fashion as normal wooden boards. The laminate has wider application potential than normal wooden boards or veneers in that it is more flexible, and can be formed into more complex shapes.

The process to fabricate the present invention begins by die cutting the wood face veneer (or other face material), as well as the substrate layers into the particular shape that best aids the thermoforming of the desired finished article.

The substrate layers are then pre-heated to a temperature of at least 300° F. Preferably, the substrate layers are kept at this temperature for approximately three minutes. The pre-heating step creates several processing advantages. The first is that any heat required by the adhesive agent is provided by the pre-heated substrate. This is a more efficient method of applying heat to the adhesive than using a heat platen and die because only the exact amount of area needed to be heated, i.e., the substrate itself, is heated. No energy is wasted in continuously heating a platen and die. Therefore, the heat source can be more contained. Any type of heat source can be utilized.

Additionally, the pre-heating of the plastic-impregnated cellulose renders it self-binding. There is no need for any adhesive between the substrate layers of the present invention.

The veneer layer(s) is then coated on its lower surface with an adhesive. The adhesive can be a sprayable or spreadable liquid adhesive, a sheet of glue paper or glue film, and the like. If more than one layer of veneer is being incorporated into the laminate, each veneer layer must be coated with an adhesive layer on its lower surface to ensure that the upper veneer layers are adequately adhered to the substrate.

The veneer layers and the substrate layers are then layed-up and cold formed in a laminate press. The laminate may be formed in either the wood-up, or wood down position, depending in large measure upon the shape of the finished article. If both sides of the laminate are to be wood-faced, this factor is not applicable. The preferred press is a two-plate (core and cavity) compression die. The mold dwell time can be as short as one minute, depending upon the thickness and shape of the laminate article. The finished product sets upon cooling.

To ensure a short cycle time, it is preferred that compression die have a metal surface, preferably steel, aluminum, or any other suitable metalized surface. Non-metalized surfaces will function adequately, however, a metalized die surface quickly dissipates the heat of the substrate, thereby shortening cycle time.

After de-molding, the newly formed laminate can be handled and manipulated in the same fashion as an all-wood product. It can be machined, drilled, trimmed, sanded, stained, and finished.

DETAILED DESCRIPTION OF THE PREFERRED EMBODIMENTS

Figure 1:
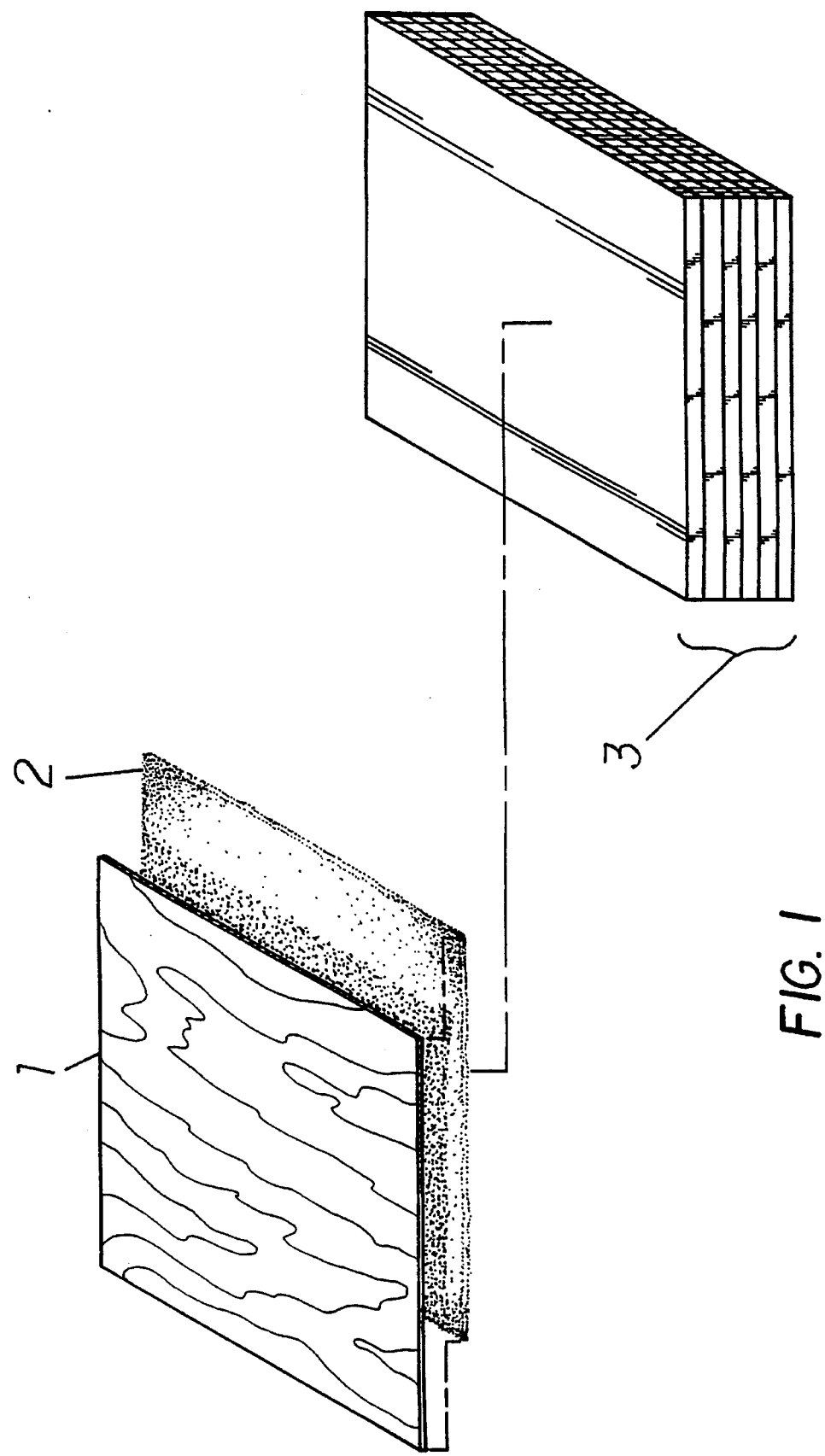
FIG. 1 is an exploded perspective view of a first embodiment of the present composite laminate.

Reference is made herein to the attached drawing figures. Like reference numerals are used throughout the various drawings to designate like elements of the claimed invention.

FIG. 1 depicts one embodiment of the present veneer laminate. The composite laminate includes an adhesive material 2, interposed between an outer layer 1, shown here as a wood veneer, and a substrate 3 comprising at least one heat-activatable, self-adhesive sheet which contains a thermoformable plastic resin and vegetable or wood fibers. The outer layer 1 may be any type of wood veneer, without exception. The outer layer 1 may also be natural and synthetic fabrics, paper, card stock, and metal foils.

The adhesive material 2 may be any type of sprayable or spreadable liquid adhesive, or glue paper, which is capable of forming a stable and permanent bond upon being heated to a temperature of approximately 300° F.

The substrate 3 is at least one sheet of a thermoformable plastic material which contains vegetable or wood fibers, preferably cellulose. The substrate plastic material is preferably polyethylene, although any thermoformable thermosetting or thermoplastic resin, such as nylons (e.g., nylon 6,6; nylon 6,10), phenolics (both novolacs and resoles), or other polyolefins (e.g., polypropylene), may be utilized.

There is no adhesive layer interposed between the substrate layers. The substrate layers are pre-heated prior to molding, which renders them self-adhesive. Upon de-molding and cooling, the substrate layers will set into a permanent and unitary layer.

As noted above, to fabricate the composite laminate, the substrate layers 3 are layed-up, and pre-heated to a temperature of at least 300° F. The surface layer 1 is then layed-up upon the pre-heated substrate layers with the adhesive layer 2 interposed between the surface layer and the substrate layers. The laminate is then cold pressed, de-molded, and allowed to cool. The laminate sets upon cooling.

Figure 2:
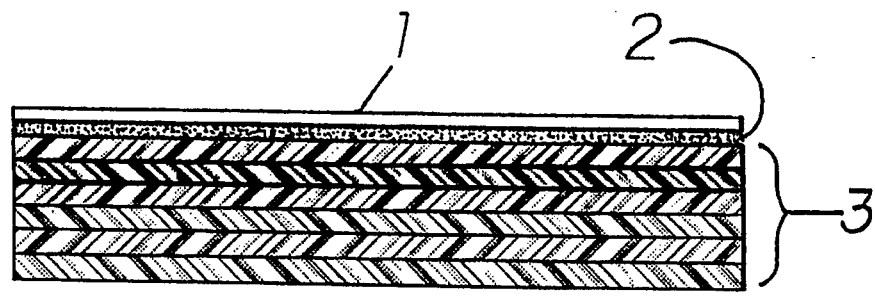
FIG. 2 is an assembled cross-sectional view of the first embodiment depicted in FIG. 1.

FIG. 2 depicts a cross-section of the embodiment shown in FIG. 1.

Figure 3:
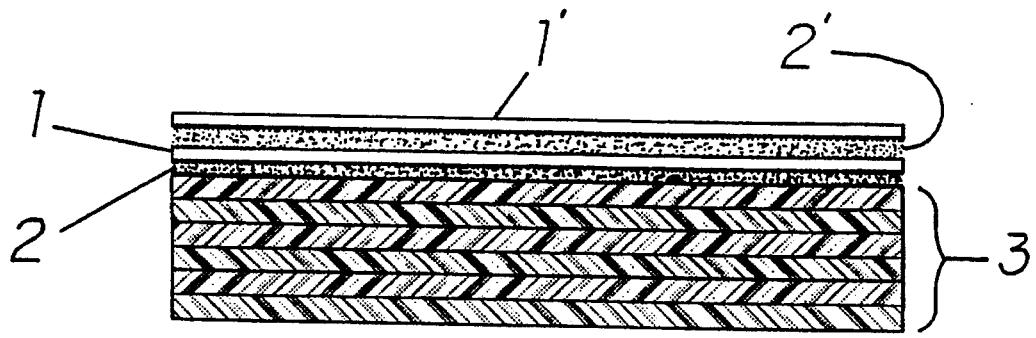
FIG. 3 is a cross-sectional view of a second embodiment of the present invention.
Figure 4:
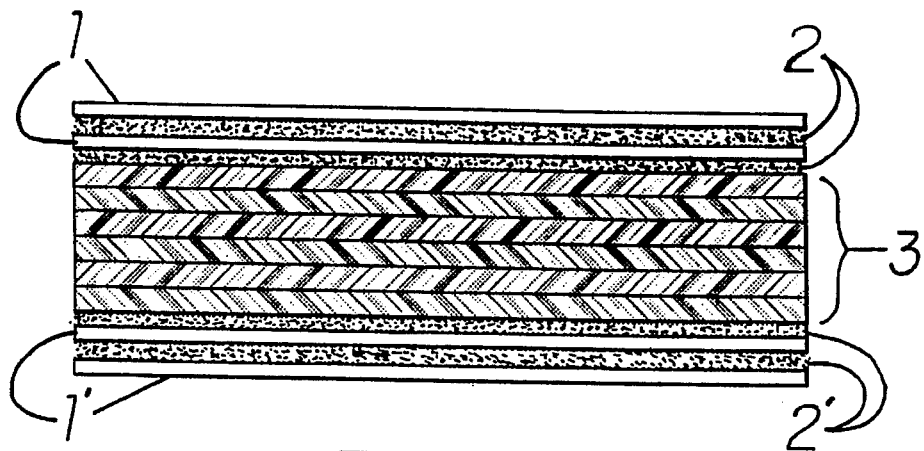
FIG. 4 is a cross-sectional view of a third embodiment of the present invention.

FIGS. 3 and 4 depict two further embodiments of the present composite laminate. FIG. 3 is the preferred embodiment, and is identical to the embodiment shown in FIGS. 1 and 2, with the addition of a second outer layer 1' and adhesive layer 2'. The second outer layer 1' is normally of the same material as the first outer layer 1. The advantage of this construction is that if the outer layers 1 and 1' are sandable, the finished article can be sanded with less risk of sanding through both outer layers 1 and 1' and into the substrate material. This construction is especially helpful if the finished laminate has been painted or stained, and a consumer wishes to refinish the laminate. The paint or stain can be sanded away with less fear that the substrate material will be accidentally exposed.

In regard to the embodiments depicted in FIGS. 1, 2 and 3, they may be molded with the surface layer(s) either face-up, or face-down. This is often dependent on the shape and complexity of the finished article, as is known to those skilled in the art.

FIG. 4 depicts a cross-sectional view of a third embodiment of the composite laminate in which the top surface of the substrate 3 is covered with first and second outer layers 1, and the bottom surface of the substrate is covered with third and fourth outer layers 1'. As in the embodiment of FIG. 3, an adhesive layer 2 is placed between the first outer layer and the substrate, as well as between the first and second outer layers. The third and fourth outer layers 1' are arranged in the same configuration. No adhesive is present between the substrate layers 3.

Figure 5:
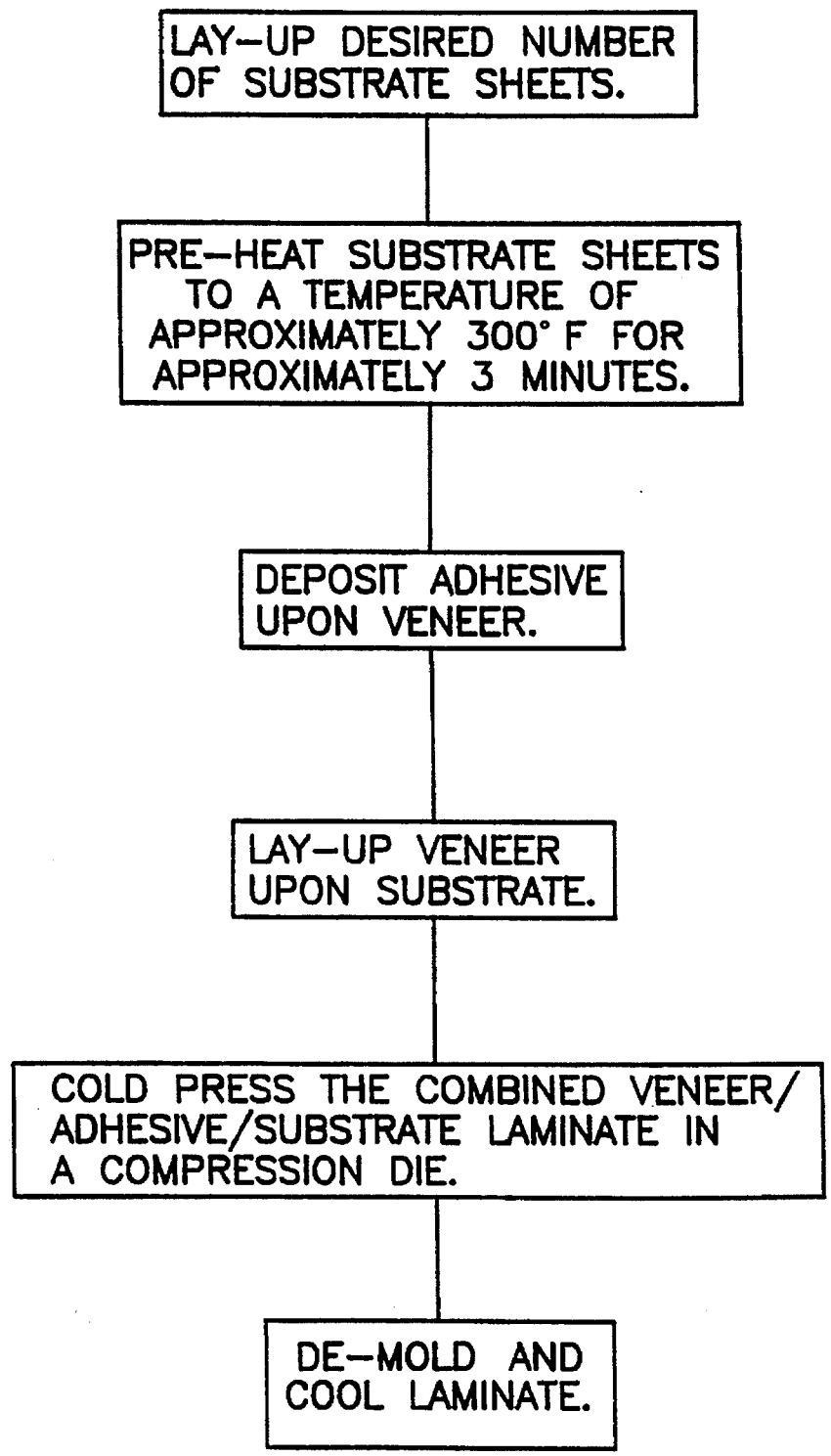
FIG. 5 is a flow-chart detailing the steps of the presently claimed method for manufacturing a composite laminate.

FIG. 5 is a flow chart outlining the method to fabricate the composite laminate. The method includes the following steps: laying-up the substrate sheets, then pre-heating the substrate sheets, applying adhesive to the bottom surface of the outer layer or layers (e.g. a veneer or veneers), laying-up the outer veneer(s) on the pre-heated substrate layers, and cold pressing the combined veneer/adhesive/substrate laminate in a compression die. The laminate is then de-molded. If a metal die is used, the laminate will be cool upon de-molding.

It is to be understood that the claimed invention is not limited to the above-described embodiments, but encompasses any and all embodiments falling within the scope of the attached claims.

I claim:

1. A composite laminate consisting essentially of:

at least one outer layer having a top surface and a bottom surface, said at least one outer layer being a wood veneer;

a substrate having a top surface and a bottom surface, said substrate comprising at least one sheet, each sheet including a thermoplastic resin that is self-binding at a temperature of about 300 degrees Fahrenheit and cellulose fibers; and a heat-activatable adhesive material interposed between said bottom surface of said at least one outer layer and said top surface of said substrate, said adhesive material becoming adhesive at a temperature of at least 300 degrees Fahrenheit, whereby said bottom surface of said at least one outer layer is bonded to said top surface of said substrate when said at least one outer layer is cold-pressed onto said top surface of said substrate.

2. The composite laminate according to claim 1, wherein said at least one sheet is heat bonded to at least one additional sheet, each one additional sheet comprising a thermoplastic resin that is self-binding at a temperature of about 300 degrees Fahrenheit and cellulose fibers.

3. The composite laminate according to claim 1, further including an adhesive material interposed between said top surface of said at least one outer layer and said bottom surface of said substrate, said adhesive material becoming adhesive at a temperature of at least 300 degrees Fahrenheit, whereby said top surface of said at least one outer layer is bonded to said bottom surface of said substrate when said at least one outer layer is cold-pressed onto said bottom surface of said substrate.

* * * * *